United States Patent [19]
Helm et al.

[11] 3,845,309
[45] Oct. 29, 1974

[54] FLUORESCENT GAS ANALYZER

[75] Inventors: Denis A. Helm, West Roxbury; William J. Zolner, Westford, both of Mass.

[73] Assignee: Thermo Electron Corporation, Waltham, Mass.

[22] Filed: Sept. 10, 1973

[21] Appl. No.: 395,408

[52] U.S. Cl. ............... 250/365, 250/372, 250/373, 250/432
[51] Int. Cl. ............................................. G01t 1/00
[58] Field of Search ...... 356/83, 246; 250/338, 339, 250/393, 432, 365, 372, 373; 328/151

[56] References Cited
UNITED STATES PATENTS

| | | | |
|---|---|---|---|
| 2,381,414 | 8/1945 | Wilkie | 250/365 |
| 3,447,089 | 5/1969 | Foley | 328/151 |
| 3,649,833 | 5/1972 | Leaf | 250/432 |
| 3,667,056 | 5/1972 | Allington et al. | 328/151 |
| 3,679,898 | 7/1972 | Compton et al. | 250/373 |
| 3,761,715 | 9/1973 | Menzies | 250/338 |

*Primary Examiner*—Harold A. Dixon
*Attorney, Agent, or Firm*—Kenway & Jenney

[57] ABSTRACT

In the fluorescent gas analyzer disclosed herein, a gaseous sample is repetitively illuminated by a flash-tube providing light in a wavelength region which will generate fluorescence in the sample constituent which is to be detected. The fluorescence is detected by a photodetector which generates a corresponding electric current signal. This signal is integrated over the duration of each flash and the voltage thereby generated is sampled substantially at the end of each flash for generating a continuous output signal which follows the successive voltage values thereby generated.

11 Claims, 3 Drawing Figures

FLUORESCENT GAS ANALYZER

BACKGROUND OF THE INVENTION

This invention relates to a fluorescent gas analyzer and more particularly to such an analyzer which operates in a pulsed mode.

With regard to efforts being undertaken to reduce atmospheric pollution, it has been of increasing concern to provide means for reliably and continuously monitoring the level of various noxious gases in both the ambient atmosphere and in various effluent sources such as stack gases and the like. The apparatus of the present invention is designed to measure and monitor those gaseous constituents which can be detected by their fluorescent characteristics. While the measurement of gaseous constituents by fluorescence is not per se novel, a practical instrument for effecting such measurements on a continuous or monitoring basis has not heretofore been available.

Among the several objects of the present invention may be noted the provision of apparatus for monitoring the level of gaseous constituents in a sample, which constituents are detectable by fluorescence; the provision of such an apparatus which is highly reliable and which can operate essentially continuously; the provision of such an apparatus which is highly accurate and is of relatively simple and inexpensive construction. Other objects and features will be in part apparent and in part pointed out hereinafter.

SUMMARY OF THE INVENTION

Briefly, apparatus according to the present invention is operative to measure the concentration of a fluorescent constituent gas in a gaseous sample which is drawn into a sample chamber. A gaseous discharge flash tube is optically coupled to the chamber and is repetitively flashed to illuminate the sample with radiant energy in a first wavelength region. A photodetector coupled to the chamber detects radiant energy given off by the sample in a second wavelength region and generates an electric signal responsive to the detected energy. The electric signal is integrated substantially over the duration of each flash to generate a sample voltage responsive to the detected energy and this voltage is reset between flashes. The sample voltage is sampled at the end of each flash and circuit means are provided for generating a continuous output signal which substantially follows these successive sample voltage values.

BRIEF DESCRIPTION OF THE DRAWINGS

Corresponding reference characters indicate corresponding parts throughout the several views of the drawings.

DESCRIPTION OF THE PREFERRED EMBODIMENT

The embodiment described hereinafter by way of illustration is an apparatus for measuring the concentration of sulphur dioxide ($SO_2$) in stack gases and the wavelength regions and physical arrangement of the system are thus correspondingly selected. It should be understood, however, that appropriate changes may be made for detecting other gases, e.g., nitric oxides ($NO_x$), and for utilization of the invention for different purposes, e.g., for monitoring the ambient atmosphere in conjunction with pollution studies.

Figure 1:
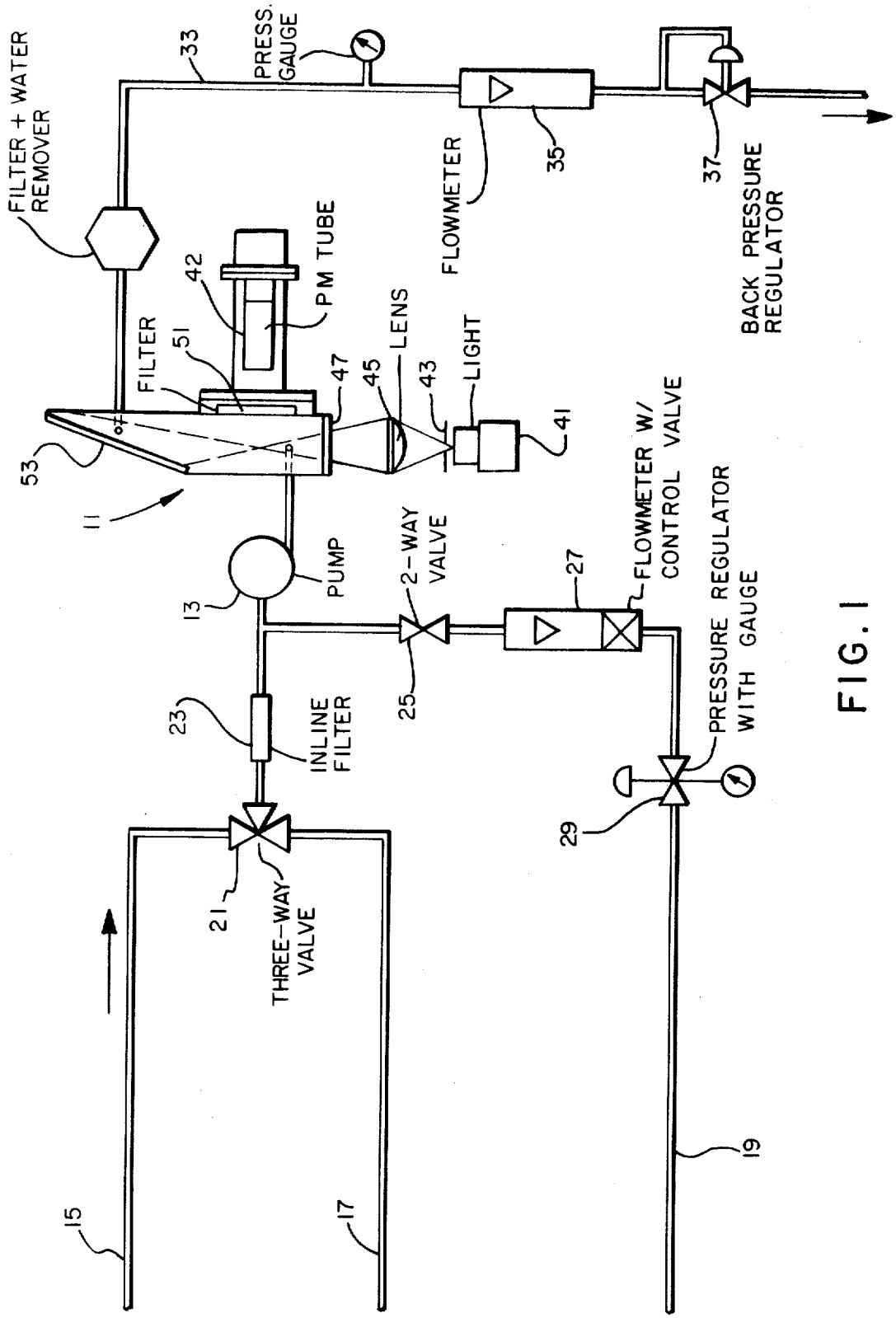
FIG. 1 is a flow diagram of a fluorescent gas analyzer constructed in accordance with the present invention, illustrating the arrangement of various mechanical components of the system.

Referring now to FIG. 1, there is indicated at 11 a sample chamber in which the actual fluorescent measurements are made. A pump 13 provides through the sample chamber 11 a flow of gas drawn from one of three possible source conduits 15, 17, and 19. Conduit 15 is connected to the source of the unknown samples, i.e., the exhaust stack containing the gases to be sampled in the embodiment illustrated. Conduit 17 obtains a sample which is essentially free of the constituent to be measured. In the embodiment illustrated where stack gases are being analyzed, the ambient atmosphere is typically adequate as a zero reference sample. A three-way valve is provided for coupling either of these two conduits to the pump 13 through an in-line filter 23 or for blocking this inlet completely. The sample chamber 11 exhausts through a conduit 33 also provide with a flowmeter 35 and a regulator 37 which allows the rate of flow of the sample gases and the pressure in the sample chamber to be adjusted and regulated to a desired and consistent level.

Conduit 19 is coupled to a reference standard sample source, e.g., bottled gas containing a predetermined level of the constituent being measured, i.e., $SO_2$. Conduit 19 is coupled to the pump inlet through a valve 25, a flowmeter 27, and an adjustable pressure regulator and gauge 29 which allows the rate of flow of the reference sample gas to be adjusted in correspondence with the rates of flow of the other sample gases.

As illustrated in FIG. 1, the sample chamber 11 is arranged along generally orthogonal axes. A flash-tube 41 is provided to illuminate a gaseous sample in chamber 11 the light being directed along the axis which is vertical in the drawing. Fluorescence of the sample gas is detected by means of a photo-multiplier tube aligned on an orthogonal axis, i.e., the horizontal axis as shown in FIG. 1. The flash-tube 41 is masked, as indicated at 43, to form an approximate line source and is imaged, by a lens 45, on a point directly in front of the photomultiplier tube 42. An interference-type bandpass filter 47 is provided at the entrance window of chamber 11 so as to confine the illuminating radiation to a preselected wavelength region. In the case of the embodiment illustrated which is for monitoring $SO_2$ stack gas concentrations, filter 47 may be an ultraviolet bandpass filter having a bandwidth of approximately 200A (angstroms) centered on a wavelength of about 2,200A. The flash-tube 41 is selected so as to have appreciable ultraviolet output in this wavelength region and may, for example, be a type FX108AU flash-tube manufactured by the Electro Optics Division of EG&G, Inc., Salem, Mass.

To reduce back scattering, the end of sample chamber 11 opposite the flash-tube 41 is chamfered as indicated at 53 so as to form a light trap, all interior surfaces of the sample chamber being treated to minimize reflection and maximize absorption.

To reduce its sensitivity to any residual back scattering of the illuminating radiation, the photo-multiplier 42 is provided with a filter, as indicated at 51, which selectively passes radiation at the wavelength region characteristic of the fluorescence of the sample constituent being measured. In the case of sulphur dioxide ($SO_3$), this filter may have a transmittance characteristic peaked at about 3,600A with a passband of approximately 1,000A, e.g., a Corning Glass filter designated as having transmittance characteristic 7-60.

Figure 2:
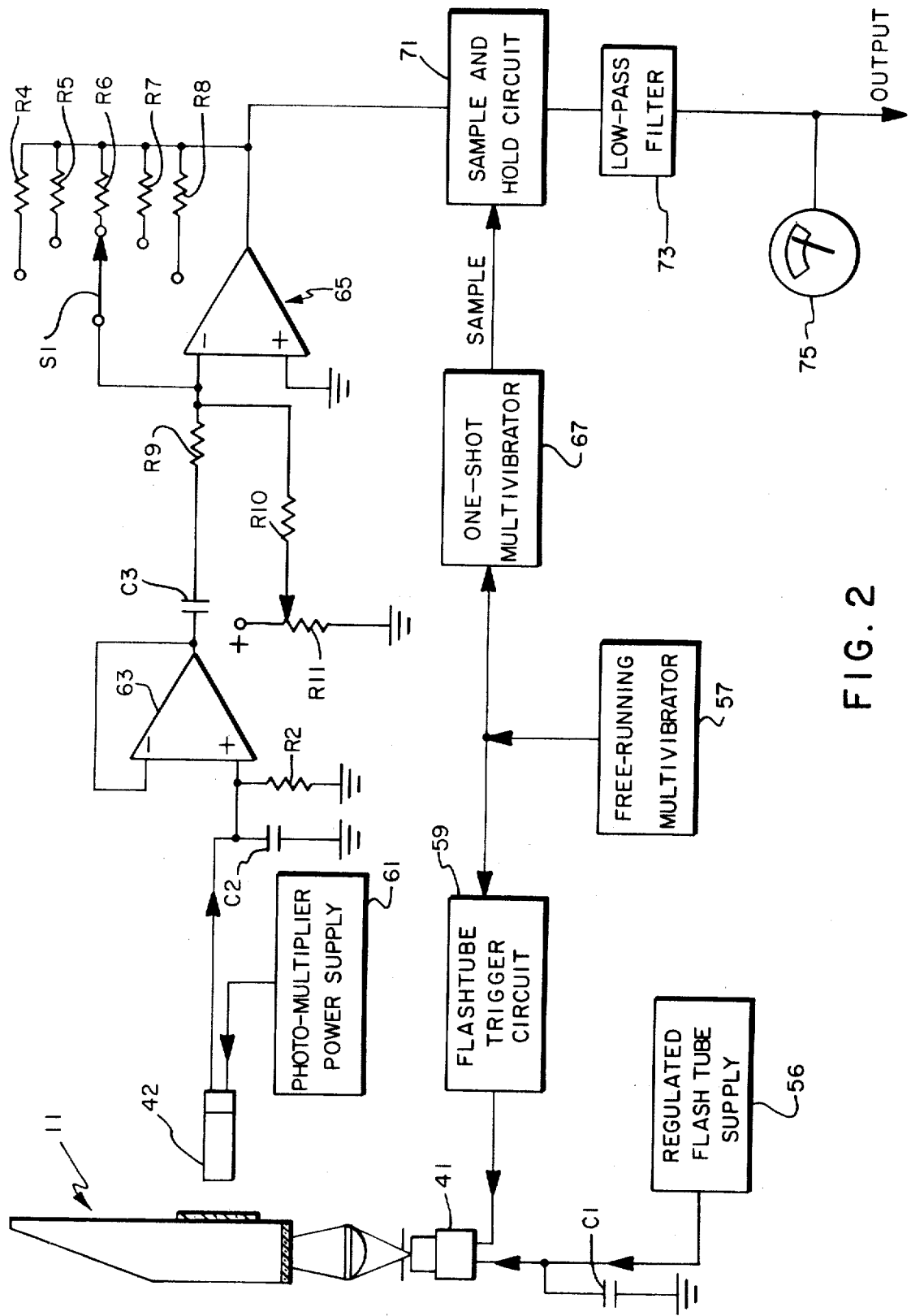
FIG. 2 is a schematic circuit diagram, partially in block diagram form, illustrating timing and measurement circuitry employed in the system of FIG. 1.

Referring now to FIG. 2, the flash-tube 41 is provided, in conventional manner, with an energy storage capacitor C1 which can be discharged through the flash-tube providing a momentary current pulse of high intensity. Between flashes, the capacitor C1 is recharged by means of a regulated flash-tube power supply 56 which controls the energy stored in capacitor C1 to a predetermined value.

Repetitive firing of the flash-tube 41 is controlled by a free-running or astable multivibrator 57 which operates a conventional flash-tube trigger circuit 59.

Figure 3:
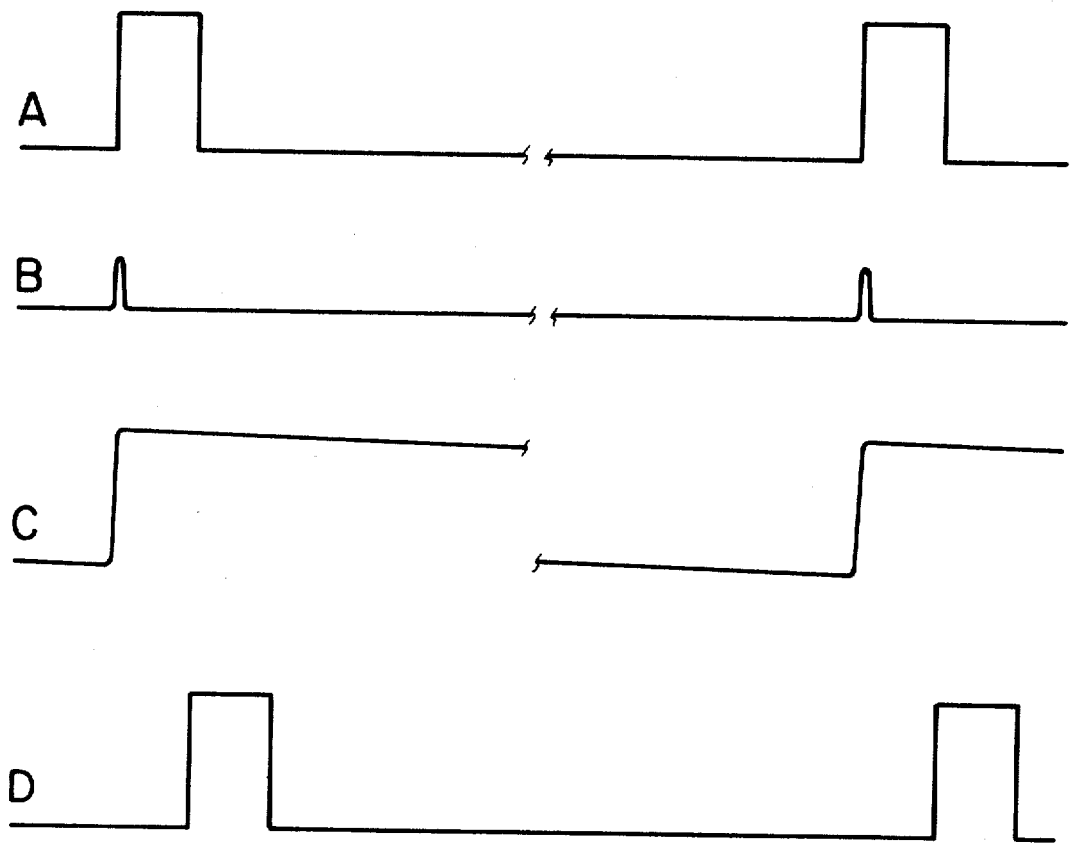
FIG. 3 illustrates various waveforms occurring in the circuitry of FIG. 2, though not to scale.

Free-running multivibrator 57 is arranged to generate a highly unsymmetrical waveform comprising positive-going squarewave pulses of approximately 200 microsecond duration at 200 millisecond intervals. Such a waveform is illustrated at A in FIG. 3. The flash-tube trigger circuit 59 is arranged so that the flash-tube discharge is initiated by the positive-going transition of the waveform generated by the free-running multivibrator 57. As is understood by those skilled in the art, the flash-tube discharge occurs in a few microseconds after triggering, following a characteristic approximately as illustrated at B in FIG. 3.

As the fluorescence phenomenon which characterizes sulphur dioxide ($SO_2$) has a time constant in the order of $10^{-9}$ seconds, it will be understood that the fluorescent radiation given off by this sample will follow a time characteristic essentially the same as that of the flash-tube and as illustrated at B in FIG. 2.

The photo-multiplier tube 42 is provided, in conventional manner, with a high voltage power supply as indicated at 61. As is understood, the operation of the photo-multiplier tube 42 is such that it will pass a signal current which is substantially proportional to the incident radiation, plus some nominal characteristic dark current. Thus, assuming that the sample chamber 11 contains some of the fluorescent constituent, e.g., $SO_2$, the photo-multiplier tube 42 will, during each flash, generate a current pulse which also substantially follows the characteristic illustrated at B in FIG. 3. This current pulse is, on a relatively short-term basis, integrated by a capacitor C2 so as to generate, on capacitor C2, a transient sample voltage having a characteristic represented at C in FIG. 3. Capacitor C2 is shunted by a bleed resistor R2 so that the capacitor voltage is discharged or reset between successive flashes, again as illustrated at C in FIG. 3.

The waveform generated across capacitor C2 is buffered by means of a relatively high speed, voltage-follower amplifier 63 and is applied, through a relatively large value coupling capacitor C3, to a selectable gain amplifier circuit 65. The gain of amplifier circuit 65 can be adjusted by means of a switch S1 which selects a respective one of a series of different-valued feedback resistors R4-R8. As is understood, the value of the selected feedback resistance, in relation to the value of an input resistor R9, determines the gain of amplifier circuit 65. The purpose of providing gain selection is to permit range selection to accommodate different nominal concentrations of the constituent being measured.

The nominal d.c. level of the waveform applied to amplifier circuit 65 can be adjusted by means of a potentiometer R11, the selected d.c. bias being applied to the input of the amplifying circuit 65 through an isolating resistance R10. The ability to adjust the d.c. level of the transient sample signal waveform allows the system to be adjusted so that the previously mentioned characteristic dark current of the photo-multiplier does not affect the final output signal level. This level can be set when the system is sampling through the conduit 19 so that no fluorescent constituent is present.

In addition to triggering the flash-tube, the free-running multivibrator 57 triggers a one-shot or monostable multivibrator circuit 67 which generates a positive-going squarewave of about 200 microsecond duration, the one-shot multivibrator being triggered by the trailing or negative-going edges of the pulses generated by the free-running multivibrator 57. The corresponding waveform is illustrated at D in FIG. 3.

The pulses generated by the one-shot multivibrator 67 control a sample-and-hold circuit 71 so that this circuit samples the amplified sample waveform during the second 200 microsecond interval following the initiation of the flash discharge. As may be seen at C in FIG. 3, the sample signal waveform will, during this interval, be substantially equal to its maximum value, since the time elapsed since the flash is relatively small as compared with the discharge time constant of capacitor C2 and resistor R2. Having sampled during the second 200 microsecond interval, the sample-and-hold circuit provides, between successive flashes, a continuing voltage equal to the integrated sample signal generated by the previous flash. As the concentration of the constituent being measured changes, it can be seen that the output voltage from the sample-and-hold circuit will change in a step-wise fashion at one-fifth second intervals. To smooth these step-wise transitions, a low-pass filter may be provided as indicated at 73 so as to provide an output signal suitable for driving an indicating meter, as indicated at 75, or for driving a record-making device such as a strip chart recorder.

Though the range-switching amplifier circuit 65 precedes the sample-and-hold circuit so as to minimize the dynamic range required of this latter circuit, it will be understood that it is still the integrated sample signal which is being sampled, even though in variously amplified forms. If desired, the rangeswitching amplifier may be considered as part of the sample-and-hold circuitry, i.e., a means of varying its sensitivity.

Summarizing, the periodic discharge of the flash-tube 41 provides illumination of the sample gas sufficiently intense to produce a detectable fluorescence of selected constituents. Through appropriate filtering and baffling, the photo-multiplier tube 42 responds selectively to this fluorescence, generating a corresponding current pulse. This current signal is integrated to generate a transient voltage which is a function of the concentration of the constituent being measured. After suitable buffering or amplification, this transient voltage is sampled and held between suuccessive flashes so as to provide a continuing output voltage, accurately representative of the constituent concentration. While the flash-tube provides illumination sufficiently intense to obtain measurable fluorescence on a transient basis, relatively long light source life can be obtained as compared with lamps providing continuous operation at the energy levels required.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Apparatus for measuring the concentration of a fluorescent constituent in a gaseous sample, said apparatus comprising:
   a sample chamber provided with means for introducing a sample into the chamber;
   a gaseous discharge flash-tube optically coupled to said chamber along a first axis for illuminating a sample therein with radiant energy, said flashtube being provided with energy storage means which can provide to said flashtube a momentary current pulse of high intensity and supply means for recharging said energy storage means between flashes;
   timing means for repetitively flashing said tube at intervals which are relatively long as compared with the flash duration;
   a photodetector optically coupled to said chamber along an axis transverse to said first axis for detecting fluorescent radiant energy given off by a sample in said chamber and for generating an electric current signal responsive to said detected energy, said photodetector being provided with filter means for confining detected energy to a second predetermined wavelength region;
   circuit means for integrating said signal over the duration of each flash to generate a sample signal responsive to the fluorescent energy given off by the sample during the flash;
   means for resetting said integrating means between successive flashes; and
   means for sampling said sample signal substantially at the end of each flash and before resetting for generating a continuous output signal which substantially follows the successive sample signal values.

2. Apparatus as set forth in claim 1 wherein said flash-tube is a Xenon flash-tube through which an energy storage capacitor is repetitively discharged.

3. Apparatus as set forth in claim 1 wherein said timing means is a free-running multivibrator.

4. Apparatus as set forth in claim 1 wherein said photo-detector is a photo-multiplier providing a current which is essentially proportional to the detected fluorescence and wherein said circuit means includes a capacitor which, on a short-term basis, integrates said current.

5. Apparatus as set forth in claim 4 wherein said capacitor is shunted by a resistor for substantially discharging said capacitor between flashes.

6. Apparatus as set forth in claim 5 including means for adjusting the nominal d.c. level of said integrated signal.

7. Apparatus for measuring the concentration of a fluorescent constituent in a gaseous sample, said apparatus comprising:
   a sample chamber provided with means for drawing a sample into the chamber;
   a gaseous discharge flash-tube optically coupled to said chamber along a first axis for illuminating a sample therein with radiant energy, said flash-tube being provided with filter means for confining said energy to a first wavelength region;
   timing means for repetitively flashing said tube;
   a photo-multiplier tube optically coupled to said chamber along an axis transverse to said first axis for detecting fluorescent radiant energy given off by a sample in said chamber and for generating an electric current signal responsive to said detected energy, said photo-multiplier tube being provided with filter means for confining detected energy to a second predetermined wavelength region;
   circuit means including a capacitor for integrating said current signal over the duration of each flash to generate a sample voltage responsive to the fluorescent energy given off by the sample during each flash and for discharging said capacitor between flashes; and
   a sample and hold circuit for sampling the voltage on said capacitor substantially at the end of each flash and for generating a continuous output signal which substantially follows the successive sample voltage values.

8. Apparatus as set forth in claim 7 wherein said sample chamber includes a light trap opposite said flash-tube.

9. Apparatus as set forth in claim 7 wherein said capacitor is shunted by a resistor for substantially discharging said capacitor between successive flashes and wherein said circuit means includes means for adjusting the d.c. level of the integrated signal.

10. Apparatus for measuring the concentration of a fluorescent constituent in a gaseous sample, said apparatus comprising:
    a sample chamber provided with means for drawing a sample into the chamber;
    a Xenon flash-tube optically coupled to said chamber along a first axis for illuminating a sample therein with radiant energy, said flash-tube being provided with filter means for confining said energy to a first wavelength region;
    timing means for repetitively flashing said tube, said means including a free-running multivibrator generating relatively short pulses at relatively long intervals, the flash-tube being triggered at the start of each short pulse;
    a photo-multiplier tube optically coupled to said chamber along an axis transverse to said first axis for detecting fluorescent radiant energy given off by a sample in said chamber and for generating an electric current signal responsive to said detected energy, said photo-multiplier tube being provided with filter means for confining detected energy to a second predetermined wavelength region;
    circuit means including a capacitor for integrating said current signal over the duration of each flash to generate a sample voltage responsive to the fluorescent energy given off by the sample during each flash and for discharging said capacitor between flashes;

a sample and hold circuit for sampling the voltage on said capacitor;

a one-shot multivibrator for generating short pulses which are initiated at the end of each pulse generated by said free-running multivibrator; and means for causing said sample and hold circuit to sample during the pulses generated by said one-shot multivibrator, whereby said sample and hold circuit generates a continuous output signal which substantially follows the successive sample voltage values.

11. Apparatus for measuring the concentration of $SO_2$ in a gaseous sample, said apparatus comprising:

a sample chamber provided with means for pumping a sample gas through the chamber;

a Xenon flash-tube optically coupled to said chamber along a first axis for illuminating a sample therein with radiant energy, said flash-tube being provided with a bandpass filter means for confining said energy to a wavelength region around 2,200A, said sample chamber being provided with a light trap opposite said flash-tube;

timing means for repetitively flashing said tube at a preselected power level;

a photo-multiplier tube optically coupled to said chamber along an axis transverse to said first axis for detecting fluorescent radiant energy given off by a sample in said chamber and for generating an electric current signal responsive to said detected energy, said photo-multiplier tube being provided with filter means for confining detected energy to a wavelength region around 3,600A;

circuit means including a capacitor for integrating said current signal over the duration of each flash to generate a sample voltage responsive to the fluorescent energy given off by the sample during each flash and for discharging said capacitor between flashes;

a sample and hold circuit for sampling the voltage on said capacitor; and means for initiating a sampling of the capacitor voltage a preselected, relatively short interval after each flash and for terminating the sampling a preselected, relatively short interval after initiation and before said capacitor is significantly discharged thereby to generate a continuing output signal which substantially follows the successive sample voltage values.

* * * * *